United States Patent [19]

Matsuda et al.

[11] Patent Number: 4,645,049
[45] Date of Patent: Feb. 24, 1987

[54] CLUTCH SYSTEM HAVING MEANS FOR CONVERTING TRANSMITTED TORQUE INTO FRICTIONAL FORCE

[75] Inventors: Minoru Matsuda, Chofu; Tadashi Muraishi, Kawagoe, both of Japan

[73] Assignee: Honda Giken Kogyo Kabushiki Kaisha, Tokyo, Japan

[21] Appl. No.: 646,331

[22] Filed: Aug. 31, 1984

[30] Foreign Application Priority Data

Sep. 1, 1983 [JP] Japan ................................ 58-160980

[51] Int. Cl.⁴ ..................... F16D 23/10; F16D 43/24; F16D 13/04
[52] U.S. Cl. ........................................ 192/35; 192/54; 192/105 B; 192/48.3
[58] Field of Search ....................... 192/35, 48.1, 48.3, 192/48.5, 54, 89 R, 105 B

[56] References Cited

U.S. PATENT DOCUMENTS

| | | | |
|---|---|---|---|
| 1,974,390 | 9/1934 | Eason | 192/35 |
| 2,588,495 | 3/1952 | Dodge | 192/35 |
| 2,801,719 | 8/1957 | Clerk | 192/35 |
| 3,184,025 | 5/1965 | Aschauer | 192/35 |
| 3,324,981 | 6/1967 | Aschauer | 192/48.3 |

FOREIGN PATENT DOCUMENTS 550261 12/1942 United Kingdom ................. 192/54

Primary Examiner—Lawrence Staab
Attorney, Agent, or Firm—Armstrong, Nikaido, Marmelstein & Kubovcik

[57] ABSTRACT

A clutch system comprising a clutch input member, a clutch output member, a primary friction clutch connected to said input member, a secondary friction clutch placed between said input and output members and operatively associated with said output member, a mechanism for disengaging said primary friction clutch, and thrust generating mechanism interconnecting said primary friction clutch and said secondary friction clutch for generating thrust to couple said secondary friction clutch when torque is transmitted by coupling of said primary friction clutch.

5 Claims, 4 Drawing Figures

CLUTCH SYSTEM HAVING MEANS FOR CONVERTING TRANSMITTED TORQUE INTO FRICTIONAL FORCE

BACKGROUND OF THE INVENTION

This invention relates to a clutch system of the friction type placed in a power transmission system.

In the past, a clutch system wherein the frictional force is provided by the force of a spring between the driving friction disk connected to the clutch input member and the driven friction disk connected to the clutch output member, has widely been used. However, in this type of clutch, the set load of the spring must be increased in order to increase the clutch capacity because of restrictions on the diameter of the driving and driven friction disks and the number of disks used. Consequently, clutch decoupling performed against the set load of the spring necessarily requires a greater operating force to the driver's disadvantage.

OBJECT AND SUMMARY OF THE INVENTION

Therefore, the object of the present invention is to provide said clutch system capable of converting transmitted torque into frictional force between the driving and driven friction disk, thereby obtaining sufficient clutch capacity even with a small operating force to decouple the clutch.

The above objects are obtained in a clutch system comprising a clutch input member, a clutch output member, a primary friction clutch connected to said clutch input member and controlled for operation by a clutch operating system, a secondary friction clutch placed between said clutch input and output members, and a thrust generator means for connecting between the driven friction disk of said primary friction clutch and the pressure plate of said secondary friction clutch and generating thrust for pressing said pressure plate so as to couple said secondary friction clutch when torque is transmitted.

DETAILED DESCRIPTION OF PREFERRED EMBODIMENTS

By referring to the attached drawings, an embodiment of the present invention applied to a clutch system for a motorcycle is described.

Figure 1:
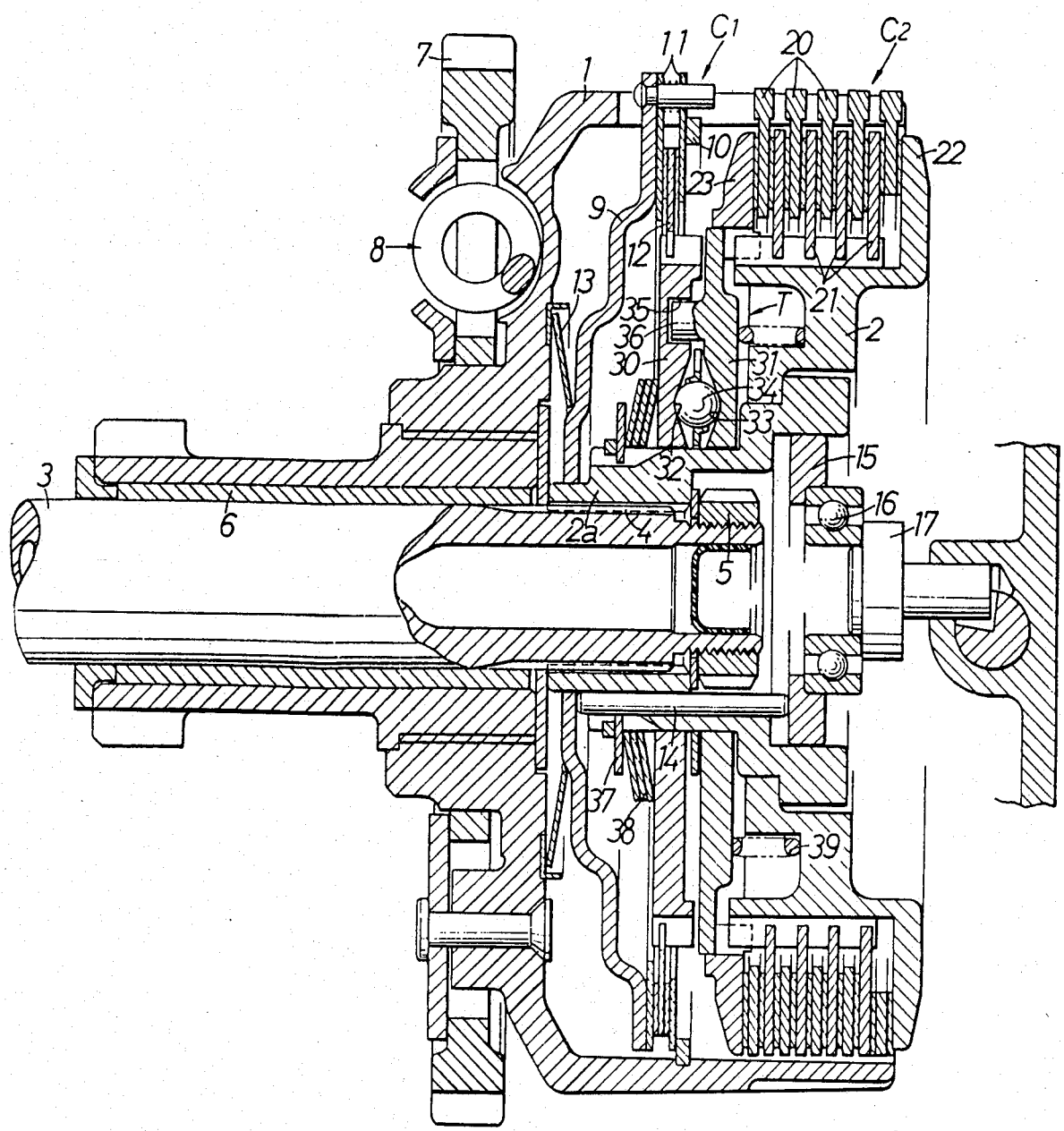
FIG. 1 is a side view showing a longitudinal section of a first embodiment of this invention.

FIG. 1 shows a first embodiment of this invention. A clutch outer member 1 of dished cylindrical shape is the clutch input member. A clutch inner member 2 is the clutch output member, and is provided within the clutch outer member 1 concentrically therewith. The inner member 2 has a boss 2a secured to a transmission main shaft 3 through a spline 4 and a nut 5. The clutch outer member is relatively rotatably supported through a plain bearing 6 on the transmission main shaft 3. On the outer periphery of clutch outer member 1, a driven gear 7 to be driven by an engine (not shown) is connected through a known torque damper 8.

A primary friction clutch $C_1$ is provided on the clutch outer member 1 and a secondary friction clutch $C_2$ is provided between the clutch outer member 1 and the clutch inner member 2. The two friction clutches $C_1$, $C_2$ are connected to each other through a thrust generator T. These components are described below.

The primary friction clutch $C_1$ includes a pressure plate 9 slideably splined to the clutch outer member 1, a receiving ring 10 retained by the clutch outer member 1 facing towards the pressure plate 9, a pair of driving friction disks 11 positioned between the pressure plate 9 and the receiving ring 10 to be slideably engaged with the clutch outer member 1, one driven friction disk 12 positioned between said pair of driving friction disks 11, and a dish-shaped clutch spring 13 constantly biassing the pressure plate 9 towards the receiving ring 10. The set load of the clutch spring 13 is set to a value weaker than that of a conventional clutch spring; that is, approximately ½ to 1/5 of the set load thereof. Ends of a plurality of thrust rods 14 (only one is shown in the figure) are installed axially and slideably through the boss 2a of the clutch inner member 2, and abut on the pressure plate 9 on the side opposite to the clutch spring 13. The other ends of the rods 14 abut on a thrust plate 15 slideably fitted in the boss 2a. A clutch lifter 17 to be operated by a clutch operating mechanism (not shown) is connected to the thrust plate 15 through a release bearing 16.

The secondary friction clutch $C_2$ includes a plurality of driving friction disks 20 slideably splined to the clutch outer member 1, a plurality of driven friction disks 21 placed alternatingly with the driving friction disks 20 and slideably engaged with the clutch inner member 2, a receiving plate 22 formed integrally on the outer end of the clutch inner member 2 and supporting the outer ends of both friction disks 20, 21, and a pressure plate 23 slideably splined to the clutch inner member 2 and capable of thrusting the inner ends of both friction disks 20, 21.

Figure 2:
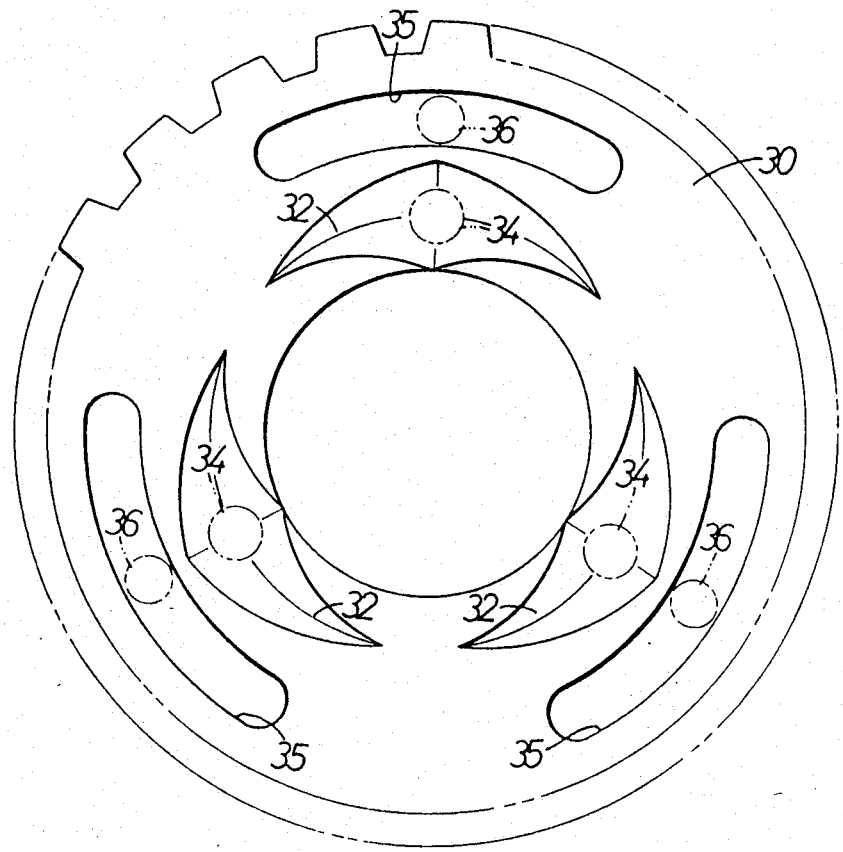
FIG. 2 is a plan view of the first cam plate in FIG. 1.
Figure 3:
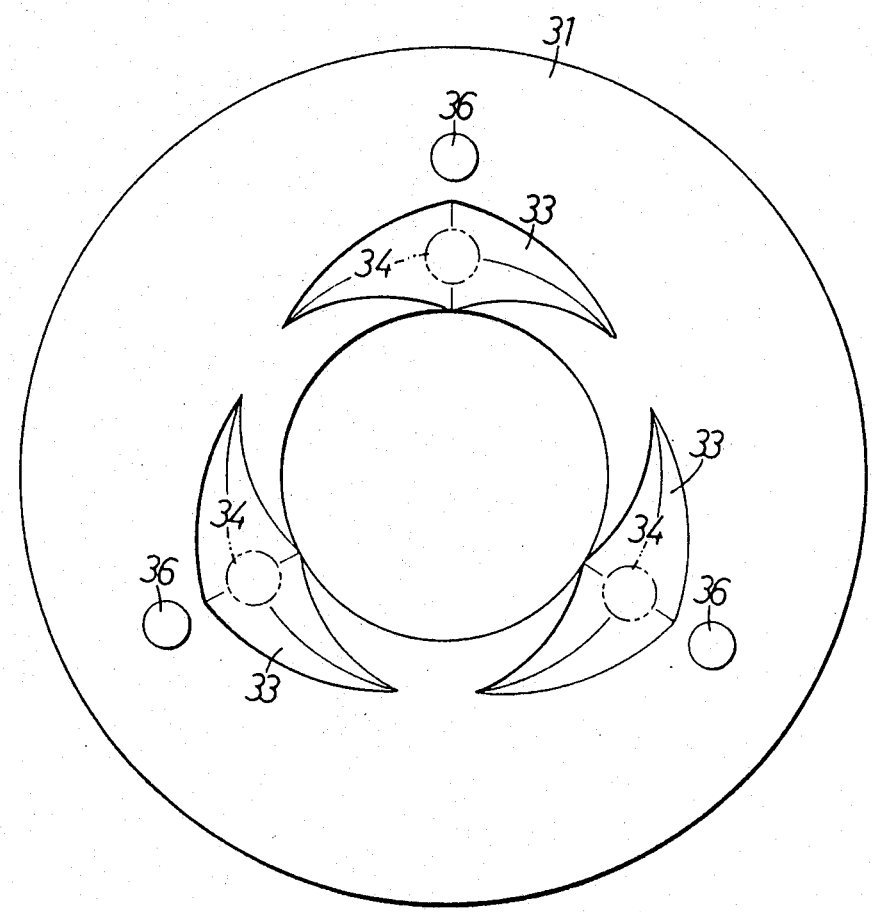
FIG. 3 is a plan view of the second cam plate in FIG. 1.

The thrust generator T comprises a first cam plate 30 slideably splined to the driven friction disk 12 of said primary friction clutch $C_1$ and rotatably supported by the boss 2a, and a second cam plate 31 integrally connected to the pressure plate 23 of said secondary friction clutch $C_2$ and rotatably supported by the boss 2a to face the first cam plate 30. Plural cam cavities 32 and 33 located facing each other are respectively formed on the opposite surfaces of the two cam plates 30, 31. Each cam cavity 32, 33 is formed so that the depth is deepest at the middle and gradually decreases from the middle to both peripheral ends of each cam plate 32, 33 (see FIGS. 2 and 3). A thrust ball 34 is inserted between each corresponding pair of cam cavities 32, 33. A plurality of arc-shaped grooves 35 are formed on the inside of the first cam plate 30. A plurality of stopper pins 36 slideably engaged with the arc-shaped grooves 35 are provided on the inside of the second cam plate 31. Consequently, when the two cam plates 30, 31 are in a neutral position where the corresponding cam cavities 32, 33 are in alignment with each other, the stopper pins are positioned at the middle of the arc-shaped grooves 35. A seat plate 37 is secured to the boss 2a adjacent to the first cam plate 30. A clutch spring 38 comprising a plurality of Schnorr disks placed one upon another, is compressedly provided between the seat plate 37 and the first cam plate 30. A return spring 39 is compressedly provided between the second cam plate 31 and the clutch inner member 2.

Hereinbelow, the operation of this embodiment is described. When the clutch lifter 16 is in an inoperative position, that is, the clutch is engaged, the force of the clutch spring 13 on the pressure plate 9 presses the driving and driven friction disks 11, 12 against the receiving ring 10 for frictional coupling thereof. Rotating torque transmitted from the engine (not shown) to the clutch outer member 1 through the driven gear 7 and torque damper 8 is transmitted to the first cam plate 30 of the thrust generator T through the driving and driven friction disks 11, 12.

Then, since the second cam plate 31 is connected to the clutch inner member 2 on the loading side through the pressure plate 23 of the secondary friction clutch $C_2$, the first and second cam plates 30, 31 start relative rotation by the torque transmitted from the primary friction clutch $C_1$. Consequently, the cam cavities 32, 33 facing each other displace relatively so as to respectivly push out the thrust balls 34 toward the shallow side. In this manner, thrust is developed between the two cam plates 30, 31 to separate them away from each other with the thrust acting on the pressure plate 23 of the second cam plate 31. The pressure plate 23 presses the driving and driven friction disks 20, 21 against the receiving plate 22 against springing force of the return spring 39. This causes the two friction disks 20, 21 to be coupled frictionally with their reaction force being borne by the clutch spring 38. Therefore, no bearing force which is stronger than the repulsion force of the clutch spring 38 will act on both friction disks 20, 21. Additionally, thrust increases in proportion to the increase of transmitted torque, so that frictional force between the two friction disks 20, 21 increases accordingly. Rotating torque of the clutch outer member 1 is thereby transmitted to the transmission main shaft 3 through both friction disks 20, 21 and the clutch inner member 2.

When the transmitted torque increases to a specified value, the stopper pins 36 abut on an end wall of the arc-shaped grooves 35 to restrain further relative turning of the two cam plates 30, 31 with respect to each other. In this manner, developed thrust is not further increased, whereby the maximum value of frictional force between the two friction disks 20, 21 is controlled.

At reverse loading, that is, when the engine is driven from the transmission main shaft 3 side, only the direction of relative turning of the two cam plates 30, 31 changes as compared with the above-mentioned case. The clutch is coupled in the same way.

When the clutch lifter 16 is moved leftward as viewed in FIG. 1, the thrust rods 14 also move leftward through the push on the release bearing 17 and the thrust plate 15. This causes the pressure plate 9 of the primary friction clutch $C_1$ to move to the left against the biassing force of the clutch spring 13, so that frictional coupling between the two friction disks 11, 12 of the primary friction clutch $C_1$ is released. Therefore, torque transmission from the driven friction disk 12 to the first cam plate 30 is discontinued. In view of this, the biassing force of the clutch spring 38 and the return spring 39 causes the two cam plates 30, 31 to start relative turning in the direction opposite to the previous one so as to come closer to each other toward the neutral position. This releases thrust to the pressure plate 23, so that frictional coupling between the two friction disks 20, 21 of the secondary friction clutch $C_2$ is released. Thus the clutch is decoupled, discontinuing torque transmission between the clutch outer member 1 and clutch inner member 2.

Figure 4:
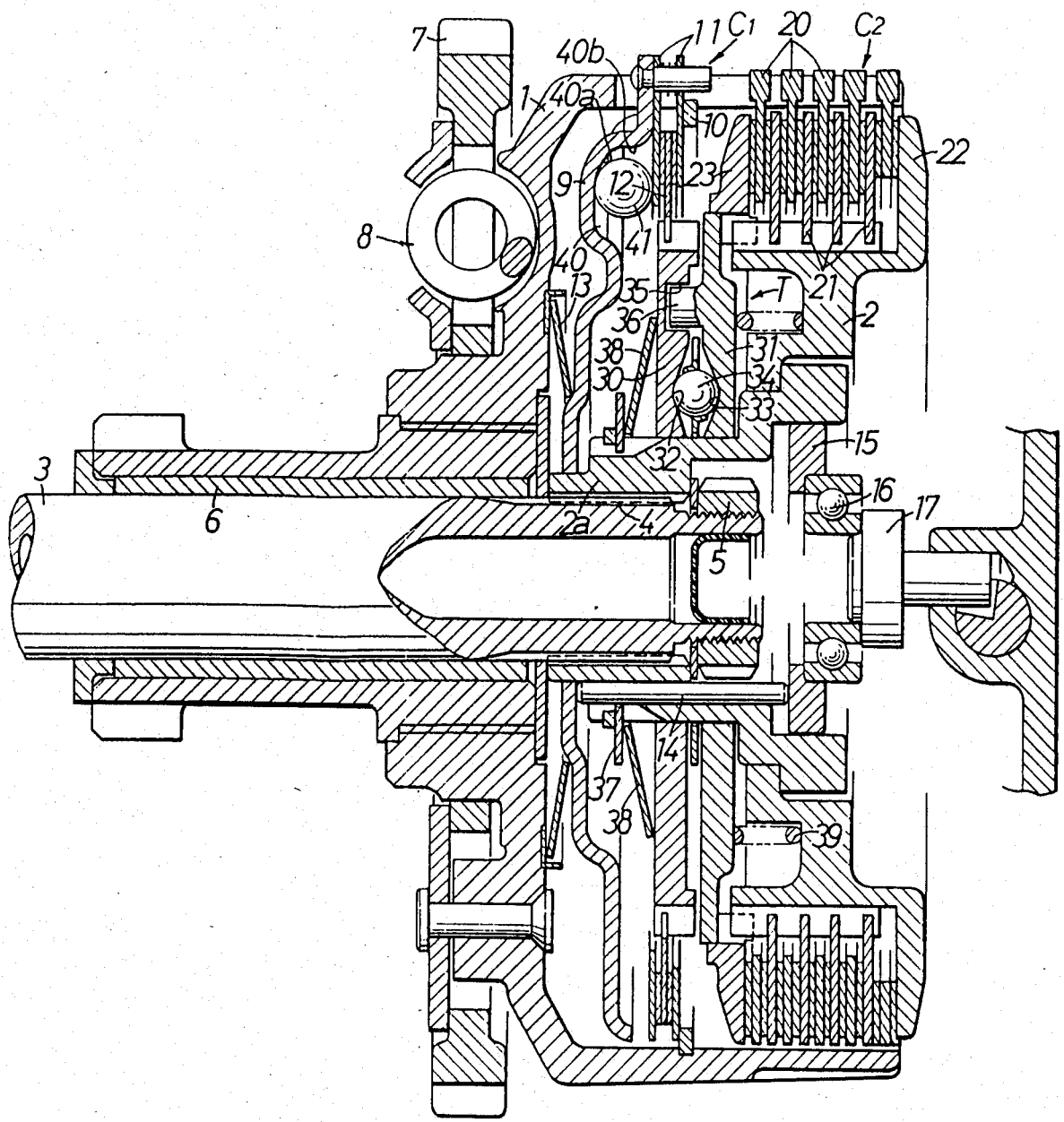
FIG. 4 is a side view showing a longitudinal section of a second embodiment of this invention.

FIG. 4 shows a second embodiment of the present invention wherein the primary friction clutch $C_1$ is constructed to be of the centrifugal type. That is, in the primary friction clutch $C_1$, a plurality of guide grooves 40 (only one of them is shown in the figure) extending radially are provided on the inside of the pressure plate 9. Each guide groove 40 has an inclined bottom 40a coming close to the driving friction disk 11 radially outwardly of the pressure plate 9 and a stopper end wall 40b rising from the outer end of the inclined bottom 40a. Each guide groove 40 houses a centrifugal weight 41 of ball shape contacting the driving friction disk 11 adjacent to the pressure plate 9. Otherwise, composition is the same as the previous embodiment, those parts in FIG. 4 which correspond to those in the previous embodiment are indicated with the same reference numerals.

Since it is composed as described, when the clutch lifter 16 is in inoperative position as the number of revolutions per minute of the clutch outer member 1 increases, each of the centrifugal weights 41 displace radially outwardly along the guide grooves 40 by centrifugal force, going up the inclined bottom 40a to bear on the driving and driven friction disks 11, 12 against the receiving ring 10 for frictional coupling of both friction disks 11, 12, with its reaction force borne by the clutch spring 13. When the rotating speed of the clutch outer member 1 increases to exceed a specified value, the centrifugal weights 41 are stopped against the stopper end wall 40b to be restricted from further radial movement, so that the maximum value of frictional force between the two friction disks 11, 12 is controlled. Otherwise, its operation is the same as the previous embodiment, so that further description is omitted.

As is seen from the foregoing, in accordance with the present invention, a clutch system comprises a clutch input member, a clutch output member, a primary friction clutch connected to said clutch input member and controlled for operation by a clutch operating system, a secondary friction clutch placed between said clutch input and output members, and a thrust generator for connecting between the driven friction disk of said primary friction clutch and generating thrust for pressing the pressure plate to couple said secondary friction clutch when torque is transmitted. Thus, it is possible for the thrust generator to convert transmitted torque from the primary friction clutch into frictional force of the secondary friction clutch, providing the secondary friction clutch with a sufficient clutch capacity for reliable coupling between the clutch input and output members. Therefore, it is sufficient for the primary friction clutch to be provided with relatively small frictional force only enough to transmit rotating torque of the clutch input member to the thrust generator. In this manner, it is possible that the set load of the clutch spring used on the primary friction clutch can be set on a smaller value than usual, thereby reducing operating force to decouple the clutch for significant improvement in the operability.

And, even though the clutch spring of the primary friction clutch is small in set load, it is possible to provide the secondary friction clutch with a great capacity, so that this clutch system can easily be installed on a reduction shaft for transmitting great torque. This is especially useful for the transmission input shaft in a motorcycle engine, for instance, whereby freedom in the power train layout is increased to the designer's advantage.

It is readily apparent that the above-described clutch system having means for converting transmitted torque into frictional force meets all of the objects mentioned above and also has the advantage of wide commerical utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A clutch system comprising:
   a clutch input member;
   a clutch output member;
   a primary friction clutch connected to said clutch input member, said primary friction clutch including: a first pressure plate slideably splined to said clutch input member; a receiving ring retained by said clutch input member and facing said first pressure plate; a pair of first driving friction disks positioned between said first pressure plate and said receiving ring and slideably engaged with said clutch input member; a first driven friction disk positioned between said pair of first driving friction disks; a dish-shaped clutch spring biassing said first pressure plate towards said receiving ring to engage said primary friction clutch; a plurality of radially extending guide grooves formed on an inner side of said pressure plate facing an outermost one of said pair of first driving friction disks, said guide grooves each having an inclined bottom portion at an outer radial portion of said pressure plate and inclined toward said outermost first driving friction disk, and a stopper end wall closing a radially outermost end of said inclined bottom portion; and a centrifugal ball-shaped weight positioned in each said guide groove and contacting said outermost first driving friction disk;
   a secondary friction clutch between said clutch input and output members and operatively associated with said clutch output member;
   means for selectively disengaging said primary friction clutch; and
   thrust generating means interconnecting said primary friction clutch and said secondary friction clutch for generating axial thrust to engage said secondary friction clutch under transmission of torque from said primary friction clutch.

2. The clutch system as claimed in claim 1, wherein said output member has a central boss thereon and said means for selectively disengaging said primary friction clutch comprises:
   a plurality of thrust rods axially received in bores in said boss and slideable therein, said rods abutting said first pressure plate on a side thereof opposite said clutch spring,
   a thrust plate slideably mounted in said boss abutting said rods, and
   means for moving said thrust plate in a direction to press said rods to move said first pressure plate against the biassing of said clutch spring, thereby disengaging said primary friction clutch.

3. A clutch system as claimed in claim 2 wherein said secondary friction clutch comprises:
   a plurality of second driving friction disks slideably splined to said input member,
   a plurality of second driven friction disks alternately arranged between said second driving disks and slideably engaged with said output member,
   a receiving plate formed integrally on an outer end of said output member and supporting an outer end face of the outermost of said second driving and driven friction disks, and
   a second pressure plate slideably splined to said output member positioned for pressing against an inner end face of the innermost of said second driving and driven friction disks.

4. The clutch system as claimed in claim 3, wherein the thrust generating means comprises:
   a first cam plate slideably splined to said first driven friction disk and rotatably supported by said boss,
   a second cam plate integrally connected to said second pressure plate and rotatably supported on said boss facing said first cam plate, said first and second cam plates having corresponding facing camming grooves thereon,
   a plurality of camming members in said camming grooves,
   means for limiting relative rotation between said first and second cam plates,
   mean for biassing said first cam plate towards said second cam plate, and
   means for biassing said second cam plate towards said first cam plate.

5. The clutch system as claimed in claim 4 wherein said means for limiting relative rotation comprises:
   circumferentially extending arcuate grooves in one of said cam plates, and
   corresponding axially extending stopper pins mounted on the other of said cam plates engaging said arcuate grooves.

* * * * *